April 29, 1924.

H. L. FERRIS

REVERSIBLE STEERING GEAR

Filed April 6, 1922

1,492,244

2 Sheets-Sheet 1

Inventor,
Henry L. Ferris,
By Dyrenforth, Lee, Chritton & Wiles,
Attys.

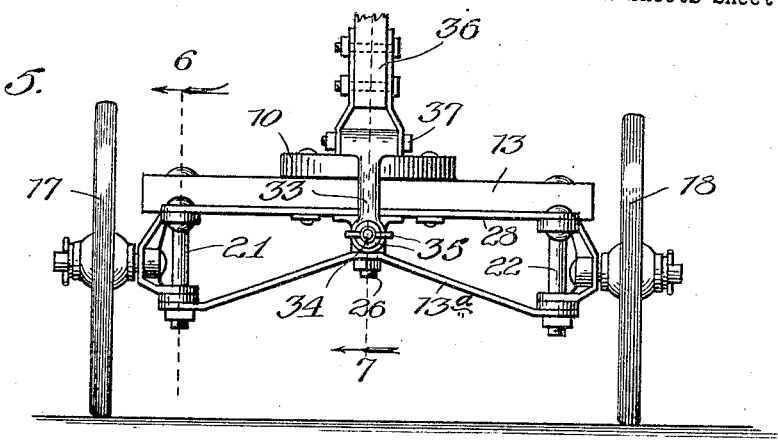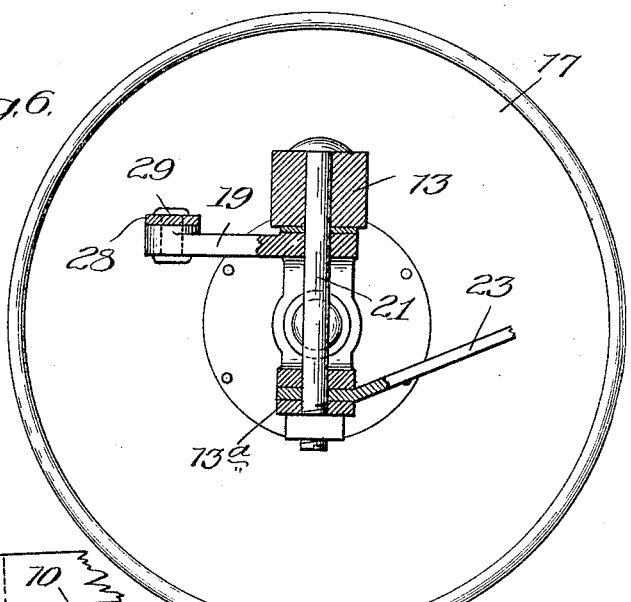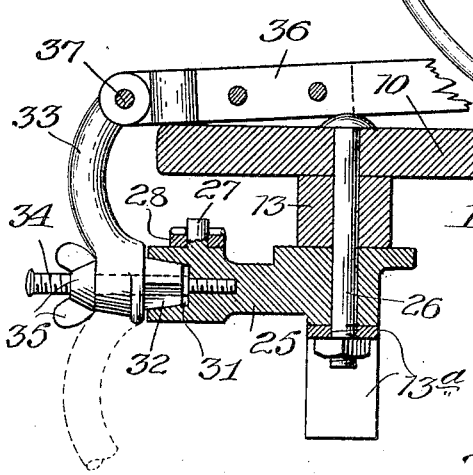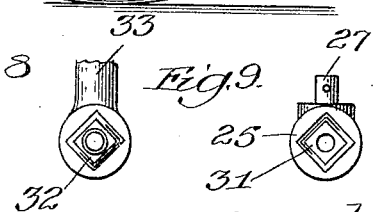

Patented Apr. 29, 1924.

1,492,244

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

REVERSIBLE STEERING GEAR.

Application filed April 6, 1922. Serial No. 550,078.

*To all whom it may concern:*

Be it known that I, HENRY L. FERRIS, a citizen of the United States, residing at Harvard, in the county of McHenry and State of Illinois, have invented a new and useful Improvement in Reversible Steering Gears, of which the following is a specification.

This invention relates to reversible steering gear for coaster wagons and the like and is particularly adapted to enable coaster wagons to be operated either side up.

The invention is fully described in the following specification and shown in the accompanying drawings, in which—

Figure 1:
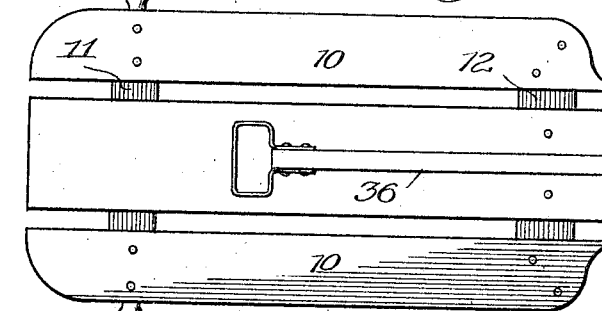
Figure 2:
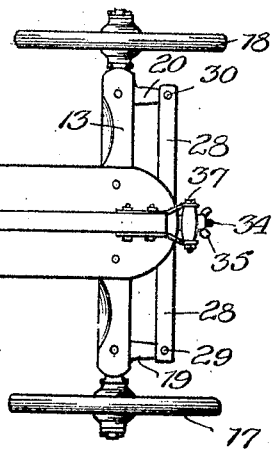
Figure 2:
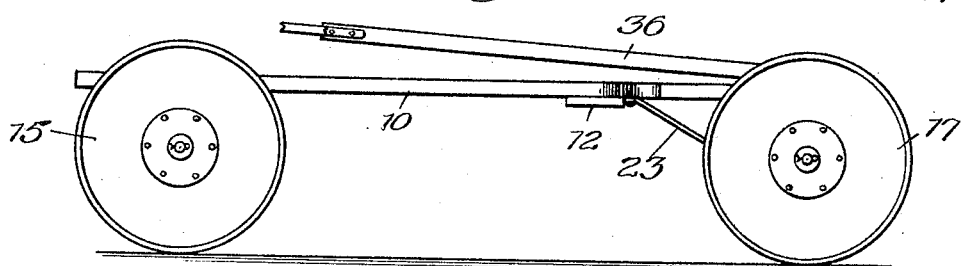
Figure 3:
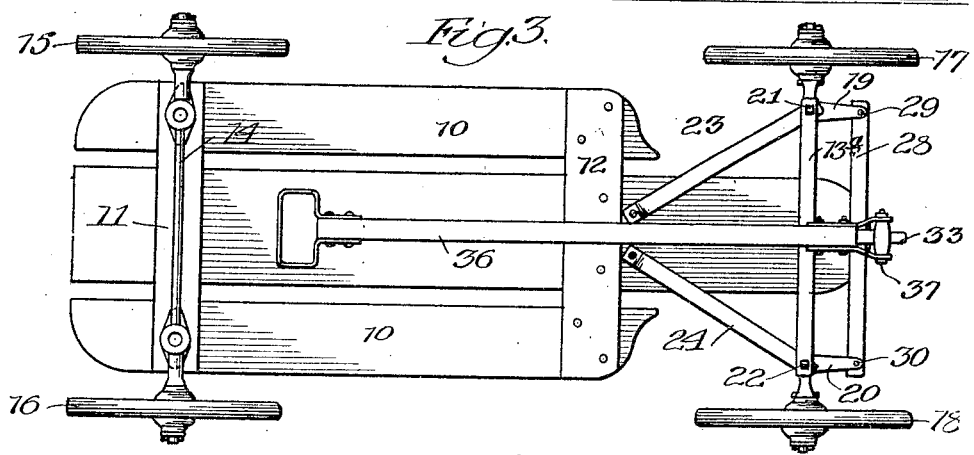
Figure 4:
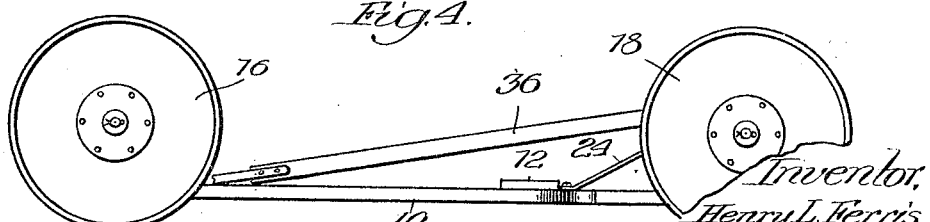

Figure 1 is a top plan view of a coaster wagon embodying the invention; Figure 2 is a side elevation of the same; Figure 3 is a top plan view of this wagon turned bottom side up; Figure 4 is a side elevation of the same; Figure 5 is a slightly enlarged front elevation of the wagon as shown in Figures 1 and 2; Figure 6 is an enlarged view on the line 6 of Figure 5; Figure 7 is an enlarged partial section on the line 7 of Figure 5 showing the steering arm and reversible bracket; and Figures 8 and 9 are details of the connection between the steering arm and bracket.

In the embodiment shown, the wagon comprises a flat body 10 having cross pieces 11, 12 and 13 secured thereto. A rear axle 14 is secured to the rear cross piece 11 and has wheels 15 and 16 journaled thereon.

The front wheels 17 and 18 are journaled upon steering knuckles 19 and 20, the latter being hingedly mounted upon pins 21 and 22, respectively, which extend thru the front cross piece 13 and are supported at their lower ends by means of braces 23 and 24 as shown in Figures 3 and 6.

A steering arm 25 is hingedly mounted at the center of the front cross piece 13 on a bolt 26 as shown in Figure 7. This steering arm carries a pin 27 which passes thru a hole in the bar or link 28 which is connected to the forward arms of the steering knuckles 19 and 20 by means of pins 29 and 30, respectively.

It will thus be seen that as the steering arm 25 is moved about the pivot bolt 26 the steering knuckles 19 and 20 will be moved about the pins 21 and 22, thereby causing the wheels 17 and 18 to be turned correspondingly to steer the wagon.

The forward end of the steering arm 25 is formed with a squared tapered recess 31 as shown in Figure 9 which is adapted to receive a small squared tapered end 32 on the bracket 33. The screw 34 passes thru the end 32 of the bracket 33 and is secured in the steering arm 25. A wing-nut 35 is threaded upon the screw 34 which is riveted over somewhat at the outer end to prevent the wing-nut from being removed.

A tongue 36 is hingedly secured to the bracket 33 by means of a horizontal pin 37.

Figure 7 shows the parts in the normal upright position of the coaster wagon as illustrated in Figs. 1 and 2. When it is desired to reverse the coaster wagon so as to use it in the inverted position as shown in Figs. 3 and 4, the wing-nut 35 is backed away so as to permit the bracket 35 to be removed far enough to be turned thru an angle of 180° about the screw 34.

The tapered end 32 is again inserted in the tapered hole 31 and the wing-nut 35 is screwed down against the bracket 33. The bracket 33 will then assume the position shown in Figure 3 and in the dotted line position shown in Figure 7.

It will thus be seen with this arrangement in which the front and rear wheels are preferably of the same diameter I have provided a coaster wagon which can be used right side up as shown in Figs. 1 and 2 and guided in the usual manner by means of the tongue 36, and that by reversing the bracket 33 the tongue can be carried back over the reverse side of the wagon as shown in Figs. 3 and 4, thus permitting the coaster wagon to be used in a reversed position, and steered from any part of the wagon by means of the tongue 36 as before.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is—

1. A coaster wagon comprising a body, wheels journalled on horizontal axes carried thereby, said wheels extending above and below said body so as to permit the wagon to run either side up, means for operably connecting the front wheels, a reversible bracket, means for locking said bracket to said means in both up and down positions, and a tongue hingedly mounted on said bracket for steering the front wheels.

2. A coaster wagon comprising a body, rear wheels journalled on a horizontal axle, front wheels, each journalled on a steering knuckle which is movable about a vertical axis, an arm operably connected to said steering knuckles, a reversible bracket secured to said arm, and a tongue hingedly connected to said bracket.

3. A coaster wagon comprising a body, rear wheels journalled on a horizontal axle, front wheels, each journalled on a steering knuckle which is movable about a vertical axis, an arm movable about a vertical axis, and operably connected to said steering knuckles, a reversible bracket secured to said arm, and a tongue hingedly connected to said bracket.

4. A coaster wagon, comprising a body, rear wheels journalled on a horizontal axle, front wheels, each journalled on a steering knuckle which is movable about a vertical axis, an arm movable about a vertical axis, links connecting said arm and steering knuckles, a reversible bracket secured to said arm and a tongue hingedly connected to said bracket.

HENRY L. FERRIS.